R. W. EGAN.
GAGING AND REVERSING MEANS FOR DRILLING AND TAPPING MACHINES.
APPLICATION FILED MAY 17, 1912.

1,154,296.

Patented Sept. 21, 1915.
2 SHEETS—SHEET 1.

Witnesses
Elsie B. Specht
C. A. Port

Inventor
Raymond W. Egan
By J. C. Grimes
Attorney

R. W. EGAN.
GAGING AND REVERSING MEANS FOR DRILLING AND TAPPING MACHINES.
APPLICATION FILED MAY 17, 1912.

1,154,296.

Patented Sept. 21, 1915.
2 SHEETS—SHEET 2.

WITNESSES
Elsie B. Specht
Lillian Wilkening

INVENTOR
Raymond W. Egan
By J. C. Grimes
His Atty.

UNITED STATES PATENT OFFICE.

RAYMOND W. EGAN, OF CINCINNATI, OHIO.

GAGING AND REVERSING MEANS FOR DRILLING AND TAPPING MACHINES.

1,154,296.   Specification of Letters Patent.   Patented Sept. 21, 1915.

Application filed May 17, 1912.   Serial No. 697,999.

*To all whom it may concern:*

Be it known that I, RAYMOND W. EGAN, a citizen of the United States, residing at Cincinnati, in the county of Hamilton and State of Ohio, have invented a certain new and useful Improvement in Gaging and Reversing Means for Drilling and Tapping Machines, of which the following is a specification.

My invention relates to a device for drilling machines, and its object is to provide means for gaging the depth of a hole being drilled or tapped and to automatically reverse the direction of rotation of the machine spindle when the drill or tap has reached a predetermined depth. In tapping a blind hole, or a hole which does not pass entirely through the material, it is difficult for the operator to determine when the tap reaches the proper depth in the hole and to stop or reverse the machine at just the right time. If he fails, however, to either stop or reverse the machine, the tap will strike the bottom of the hole, in which event, the threads will be stripped either from the tap or from the hole. With my improved device, the machine is automatically reversed at the proper time without any attention from the operator, and any number of holes may be accurately drilled or tapped to a predetermined depth without danger of injuring the tool or the work and in a minimum amount of time. I attain these objects by the mechanism illustrated in the accompanying drawings, in which—

Figure 1:
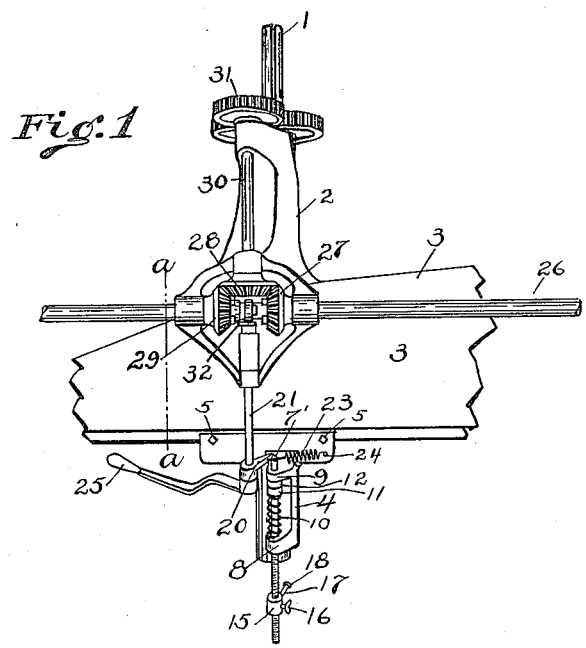
Figure 2:
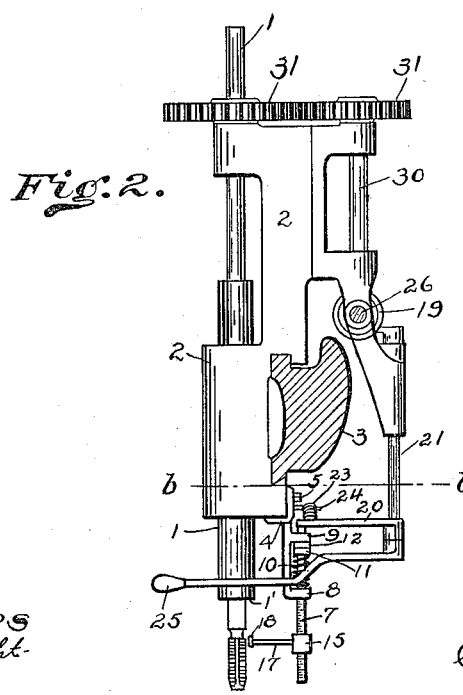
Figure 4:
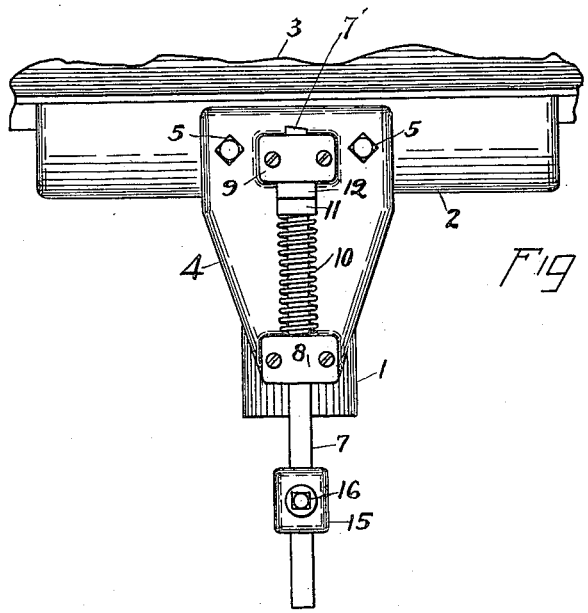
Figure 3:
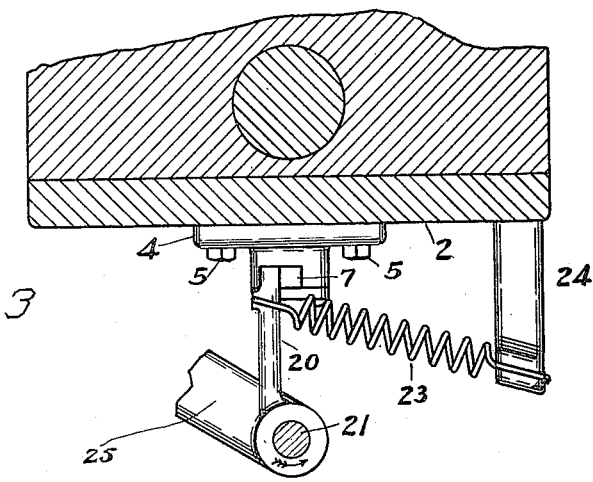

Figure 1 is a perspective view of my device shown in connection with the head and a part of the arm of a radial drill. Fig. 2 is a side view shown attached to the head of a radial drilling machine, the head being shown in side elevation and the radial arm in cross-section on line $a$—$a$ of Fig. 1. Fig. 3 is an enlarged sectional view on line $b$—$b$ of Fig. 2, and Fig. 4 is an enlarged elevation of the gage and the supporting brackets showing the lower end of the machine spindle and the lower part of the machine head to which the bracket is attached.

In the drawings the spindle 1 is journaled in the machine head 2, which latter is slidably mounted upon the radial arm 3 of the drilling machine. Motion is imparted to the spindle by means of the drive shaft 26, and bevel gears 27, 28 and 29, the shaft 30 and the gears 31, and the direction of the rotation of the spindle is manually controlled by the operator from the front of the machine by means of the lever 25, shaft 21 and clutch 32. The driving mechanism and the mechanism for controlling the direction of rotation of the spindle are not a part of my invention, but the same or similar mechanisms are common to drilling machines, and it is therefore not thought necessary to describe them more in detail.

My improved device consists of the bracket 4 which is secured to the head 2 by means of the bolts 5. The bracket supports the gage 7 in bearings 8 and 9, and the gage is held in normal position by the spring 10 and the collars 11 and 12. The collars are secured on the gage by any suitable means. The stop 15 is adjustably secured on the gage by means of the set screws 16 and has an outwardly projecting arm 17 which is provided at its outer end with a roller bearing 18 and which is adapted to engage the lower end 1′ of the machine spindle.

On the shaft 21 which is normally operated by means of the lever 25, I have placed an arm 20 which is adapted to coöperate with the gage 7. The arm 20 is actuated by means of the spring 23 which is attached to one end of the arm 20 as shown in Fig. 3, the other end being attached to the outer end of the lug 24.

When preparing to drill or tap a hole, the stop 15 is adjusted on the gage 7 according to the depth of the hole to be drilled or tapped. The operator then moves the lever 25 toward the right as he stands facing the machine, revolving the shaft 21 in the direction of the arrow as shown in Fig. 3, thus throwing the clutch 32 into connection with the gear 29 and causing the spindle to revolve in the direction for drilling or tapping a hole. The revolution of the shaft 21 moves the arm 20 across and behind the upper end 7′ of the gage 7 and expands the spring 23 also as shown in Fig. 3. The end of the gage 7 is beveled at 7′ and the arm acting on the bevel depresses the gage until the arm passes over and behind it, when the gage is automatically raised by means of the spring 10 to its normal position and into engagement with the arm 20 which is then held in the position as shown in Fig. 3. The arm is held in this position until the spindle reaches the required depth at which time it engages the roller 18 on the stop 15, again depressing the gage 7 until the arm 20 is released, when the tension of the spring draws the arm toward the stop, revolving the shaft 21 in the opposite direction and bringing the clutch into engagement with the gear 27, thereby reversing the direction of rotation of the spindle and withdrawing the drill or tap from the hole.

The use of my device is not limited to the particular type of machine shown in the drawings but it may be adapted and applied to any drilling machine.

Having fully described my invention, what I claim and desire to secure by Letters Patent is:

1. In a machine of the class described, the combination with a head-stock carrying a rotatable and longitudinally movable spindle, and a manually controlled reversing mechanism for reversing the direction of rotation of the spindle, of a bracket supported on the head-stock, a gage supported in the bracket, a stop carried on the gage and adjustable longitudinally thereof, an arm supported on said manual controlling means and adapted to co-act with said gage, and actuating means for the arm, all substantially as described.

2. In a machine of the class described, the combination with a head-stock carrying a rotatable and longitudinally movable spindle, and a manually controlled mechanism for reversing the direction of rotation of the spindle, of a bracket supported on the head-stock, a graduated gage supported in the bracket, a stop carried on the gage and adjustable longitudinally thereof, an arm supported on said manual controlling means and adapted to co-act with said gage and actuating means for the arm, all substantially as described.

RAYMOND W. EGAN.

Witnesses:
LILLIAN WILKENING,
ELSIE B. SPECHT.

Copies of this patent may be obtained for five cents each, by addressing the "Commissioner of Patents, Washington, D. C."